United States Patent [19]

Nakatsuyama et al.

[11] Patent Number: 5,752,021
[45] Date of Patent: May 12, 1998

[54] DOCUMENT DATABASE MANAGEMENT APPARATUS CAPABLE OF CONVERSION BETWEEN RETRIEVAL FORMULAE FOR DIFFERENT SCHEMATA

[75] Inventors: Hisashi Nakatsuyama; Yo Okumura; Go Uchida, all of Kanagawa, Japan

[73] Assignee: Fuji Xerox Co., Ltd., Tokyo, Japan

[21] Appl. No.: 443,751

[22] Filed: May 18, 1995

[30] Foreign Application Priority Data

May 24, 1994 [JP] Japan .................. 6-132504

[51] Int. Cl.$^6$ .................................. G06F 17/30
[52] U.S. Cl. .............. 395/605; 395/606; 395/602; 395/611; 707/6; 707/2; 707/10
[58] Field of Search .................. 395/600, 700, 395/500, 650, 611, 605, 606, 602

[56] References Cited

U.S. PATENT DOCUMENTS

| | | | |
|---|---|---|---|
| 5,201,046 | 4/1993 | Goldberg et al. | 395/600 |
| 5,206,951 | 4/1993 | Khoyi et al. | 395/650 |
| 5,235,701 | 8/1993 | Ohler et al. | 395/600 |
| 5,261,080 | 11/1993 | Khoyi et al. | 395/500 |
| 5,265,065 | 11/1993 | Turtle | 395/606 |
| 5,280,574 | 1/1994 | Mizuta et al. | 395/146 |
| 5,280,610 | 1/1994 | Travis, Jr. et al. | 395/614 |
| 5,295,261 | 3/1994 | Simonetti | 395/600 |
| 5,303,379 | 4/1994 | Khoyi et al. | 395/700 |
| 5,418,948 | 5/1995 | Turtle | 395/606 |
| 5,421,012 | 5/1995 | Khoyi et al. | 395/650 |
| 5,421,015 | 5/1995 | Khoyi et al. | 395/650 |
| 5,437,027 | 7/1995 | Bannon et al. | 395/600 |
| 5,446,880 | 8/1995 | Balgeman et al. | 395/600 |
| 5,488,725 | 1/1996 | Turtle et al. | 395/603 |
| 5,491,628 | 2/1996 | Wakayama et al. | 364/419.08 |
| 5,499,371 | 3/1996 | Henninger et al. | 395/700 |

OTHER PUBLICATIONS

Nagao, Katayama and Uemura, "Structure of Information and Database," (in Japanese), pp. 95–101, date unknown.

Martin Bryan, "SGML –An Author's Guide to the Standard Generalized Markup Lanquage," ASCII Publication Department, pp. 13–16, date unknown.

Rom Narayan, "Data Dictionary –Implementation , Use, and Maintenance," Prentice Hall, 1988, pp. 1–9.

Kaul et al, Integrating Heterogeneous Information Bases by Object–Oriented Views, IEEE, pp. 2–10, Jan. 1990.

Urban, A Semantic Framework Heterogeneous Database Environments, IEEE, pp. 156–163, Jan. 1991.

Primary Examiner—Thomas G. Black
Assistant Examiner—Frantz Coby
Attorney, Agent, or Firm—Finnegan, Henderson, Farabow, Garrett & Dunner, L.L.P.

[57] ABSTRACT

A semantic description storing means stores semantic descriptions representative of meanings of respective document components. A semantic description designating means designates one of the semantic descriptions stored in the semantic description storing means. A schema storage means stores, in a correlated manner, a schema and the designated semantic description of a document component of the schema. A document retrieving means performs retrieval on a database by using the semantic description thus stored in the schema storage means. A retrieval formula conversion means causes the schema retrieving means to call the correspondence between the semantic description and the schema from the schema storage means, receives a first retrieval formula relating to a first schema and directed to first retrieval, and converts the first retrieval formula to a second retrieval formula relating to a second schema and directed to second retrieval that is equivalent to the first retrieval.

4 Claims, 11 Drawing Sheets

TYPE A

| TAG NAME | SEMANTIC DESCRIPTION |
|---|---|
| PARAGRAPH | "PARAGRAPH" |

FIG. 5B

TYPE B

| TAG NAME | SEMANTIC DESCRIPTION |
|---|---|
| PARA | "PARAGRAPH" |
| SENTENCE | "NONE" |

FIG. 5C

TYPE C

| TAG NAME | SEMANTIC DESCRIPTION |
|---|---|
| P | "PARAGRAPH" |
| L | "ITEMIZED DESCRIPTION" |
| I | "NONE" |

| | TYPE DEFINITION | |
|---|---|---|

71 — STORE | CANCEL

72 — TYPE NAME

73 — SEMANTIC DESCRIPTION | CHAPTER | SECTION | PARAGRAPH | ITEMIZED DESCRIPTION | NONE

74 — CONTENT PORTION | TEXT | FIGURE | GRAPH | NONE

75 — COMMENT

ATTRIBUTE     ATTRIBUTE NAME                    DOMAIN

ATTRIBUTE 1                         DOMAIN 1

76 —
| ATTRIBUTE 1 | DOMAIN 1 |
| ATTRIBUTE 2 | DOMAIN 2 |

77 — ALTER | ADD | DELETE

DOCUMENT DATABASE MANAGEMENT APPARATUS CAPABLE OF CONVERSION BETWEEN RETRIEVAL FORMULAE FOR DIFFERENT SCHEMATA

BACKGROUND OF THE INVENTION

1. Field of the Invention

The present invention relates to a database management apparatus and a document database system for managing a database designed for management of documents. The term "document" in this specification means a text of a character string, and a drawing, table, photograph, image, etc. that has a caption of a character string.

2. Discussion of the Prior Art

In recent years, it is very common to produce a document using an information processing apparatus such as a computer or a word processor. Electronic filing apparatuses for storing produced document data and document database systems for retrieving document data stored in an electronic filing apparatus have been developed and are now marketed.

Particularly, in the document database system, a chapter, section and paragraph, which are dividable units in a document, and a drawing, table, graph, etc. are made document components, and the document components are used as retrieving information. Therefore, reuse of a retrieved document is facilitated.

To reuse document data of the document database, the information processing apparatus must understand meanings of document components of a document. In the document database system, a schema that is used in document retrieval defines document components of a document and their meanings.

Usually, in the document database system, the structure of document components of a document and their meanings are stored systematically in a schema storage means. For an exemplary schema, reference is made to Nagao, Katayama and Uemura, "Structure of Information and Database" (in Japanese), Iwanami Shoten, and Rom Harayan, "Data Dictionary—Implementation, Use, and Maintenance" Prentice Hall, 1988.

The information retained by the schema storage means of the above document database system includes a data item name (document component name), a definition of the data item (definition of the document component), a size (number of bytes) of the data item, a designer of the data item (name of a person who defines a data type), and a storage position (address) of the data item.

In writing an application program or making an ad hoc inquiry (not an inquiry incorporated in an application program, but made by a user to designate a retrieval formula), a user utilizes the information stored in the schema storage means.

Next, a description will be made of a document database system for managing SGML (standard generalized markup language; ISO 8879) documents. For the SGML, reference is made to Martin Bryan, "Introduction to SGML," ASCII Publication Department.

The document type definition (DTD) in the SMGL is considered to be the schema in the document database system. The document type definition in the SGML defines document components belonging to the document type and the connection between the document components.

For example, the following document type definition can be given.

```
<!DOCTYPE Type A [
<!ELEMENT Type A-O (Paragraph+)>
<!ELEMENT Paragraph - O (#PCDATA)>
]>
```

The first line of the above document type definition defines a document type "Type A." The second line defines that a document (instance) of "Type A" has a simple structure in which at least one "Paragraph" appears repeatedly. The third line defines that "Paragraph" has a character content.

An example of a type A instance is as follows

```
<Type A>
<Paragraph> This is the first paragraph. </Paragraph>
<Paragraph> This is the second paragraph. </Paragraph>
<Paragraph> This is the final paragraph. </Paragraph>
</Type A>
```

In the above example, <Type A>, </Type A>, <Paragraph> and </Paragraph> are called tags, and used to indicate boundaries of a document component (entity).

<Type A> and <Paragraph> are called start tags, and indicate a start point of a description of a document component. </Type A> and </Paragraph> are called end tags, and indicate an end point of a description of a document component. A portion between <Type A> and </Type A> is an instance of "Type A". A portion between <Paragraph> and </Paragraph> is a document component of "Paragraph". It is understood that the above example describes a document instance having three "Paragraph"'s.

The tag may be named arbitrarily by a designer of a document type definition. Therefore, a document component representative of a paragraph need not always be named "Paragraph," but may be described in another way. For example, the following two document type definitions may be employed.

The first example is as follows:

```
<!DOCTYPE Type B [
<!ELEMENT Type B-O (Para+)>
<!ELEMENT Para - O (Sentence+)>
<!ELEMENT Sentence - O (#PCDATA)>
]>
```

The second example is as follows:

```
<!DOCTYPE Type C [
<!ELEMENT Type C-O (P+)>
<!ELEMENT P-O (#PCDATA|L)+>
<!ELEMENT L-O (I+)>
<!ELEMENT I-O (#PCDATA)>
]>
```

The document component corresponding to a paragraph is "Para" in the document type "Type B," and "P" in the document type "Type C." Although "Paragraph" and "P" mean a paragraph, the tag names are not "Paragraph." Further, the paragraphs of the document types "Type B" and "Type C" are different from the paragraph of the document type "Type A" in the content model (lower-rank structure). In "Para" of "Type B," it is a repetition of "Sentence"'s. In "P" of "Type C" it includes, in the character string, "L" that represents an itemized description.

When a user of the database (a database programmer or an end user) retrieves documents on the basis of the content of a paragraph, he needs to read information stored in the schema storage means, specify the name of a document component ("P" for a document of "Type C", for example) representative of a paragraph defined by the schema, and construct a retrieval formula using that name.

Figure 11:
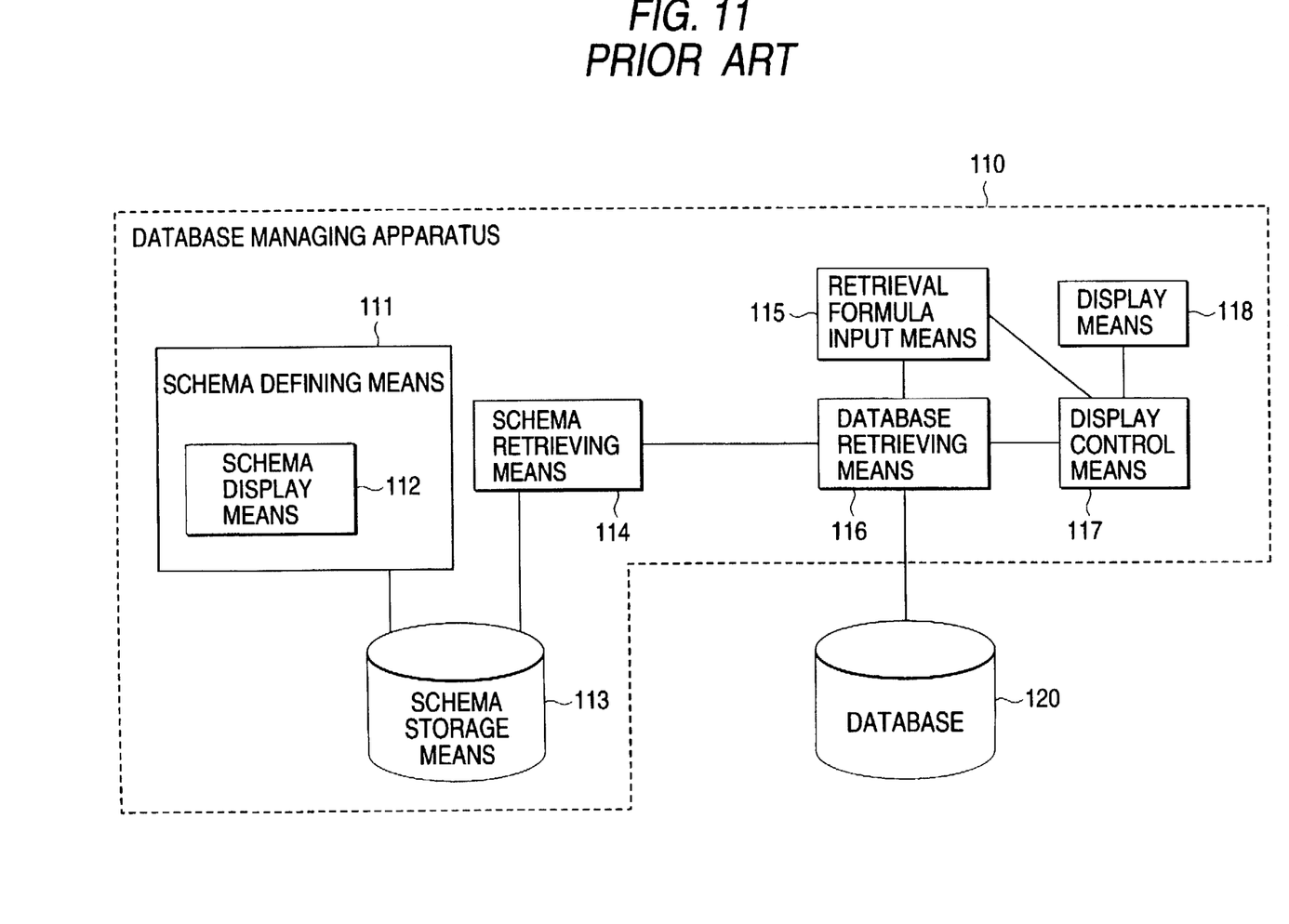
FIG. 11 is a block diagram showing a general configuration of a conventional document database system.

FIG. 11 is a block diagram showing a general configuration of a conventional document database system. As shown in FIG. 11, a document database system is composed of a database management apparatus 110 and a database 120, which are interconnected by a network when necessary.

The database management apparatus 110 is made up of a schema defining means 111 for defining the structure of document data stored in the database 120, a schema display means 112 for displaying a schema definition, a schema storage means 113 for storing schemata defined by the schema defining means 111, a schema retrieving means 114 for retrieving schemata stored in the schema storage means 113, a retrieval formula input means 115 for inputting a retrieval formula to find document data in the database 120, a database retrieving means 116 for finding, in the database 120, document data that satisfy retrieval conditions on the basis of the retrieval formula that has been input through the retrieval formula input means 115 and the definition relating to the structure of document data which has been found by the schema retrieving means 114, a display control means 117 for controlling the display of the retrieval formula or results of the retrieval, and a display means 118 for displaying the retrieval formula or the retrieval results under the control of the display control means 117.

Figure 12:
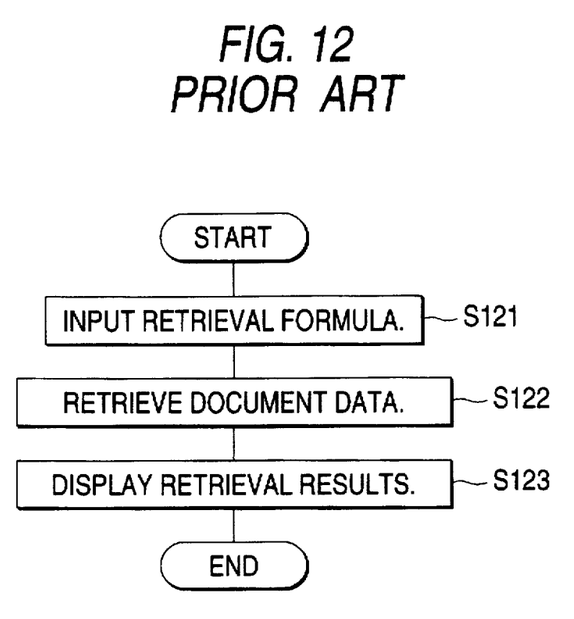
FIG. 12 is a flowchart showing a process of retrieving document data by the conventional document database system.

FIG. 12 is a flowchart showing a process of retrieving document data by the above conventional document database system.

Referring to FIG. 12, prior to the retrieval, a user activates an inquiry editor (not shown), and inputs a retrieval formula while looking at the inquiry editor displayed on the display means 118 (step S121).

The database retrieving means 116 finds, in the database 120, document data that satisfy retrieval conditions on the basis of the retrieval formula described by the user and the definition of the structure of document data which has been found by the schema retrieving means 114 (step S122).

Results of the retrieval by the database retrieving means 116 are displayed on the display means 118 under the control of the display control means 117 (step S123).

The information stored in the schema storage means is arranged so as to be easily understood by persons. The document components are described in a natural language so as to be understandable to any user. However, the meaning of document components described in a natural language cannot be processed in a simple manner by a computer.

Therefore, the above conventional document database system cannot perform, using a semantic description, conversion for applying a retrieving formula to a different schema nor generate a retrieval formula for retrieving a different schema from a retrieval formula using a semantic description.

That is, in the above document database system, it is impossible to generate a retrieval formula written in an inquiry language provided by the document database system from a retrieval formula written in a language other than the inquiry language provided by the document database system.

For example, although an inquiry for the document component "Paragraph" in a document of "Type A" is equivalent to an inquiry for the document components "P" in a document of "type C," mutual conversion between those retrieval formulae cannot be performed only by means of a machine.

SUMMARY OF THE INVENTION

The present invention has been made to solve the above problems, and has an object of providing a database management apparatus and a document database system can perform mutual conversion between retrieval formulae that use different document type definitions and generate a retrieval formula from another one using a different document type definition only by means of a machine.

To achieve the above object, the invention provides a document database management apparatus for managing documents, comprising:

means for storing semantic descriptions representative of meanings of respective document components;

means for designating one of the semantic descriptions stored in the semantic description storing means;

means for storing, in a correlated manner, a schema and the designated semantic description of a document component of the schema; and means for performing retrieval on a database by using the semantic description stored in the schema storage means.

The database retrieving means may include means for receiving a first retrieval formula relating to a first schema and directed to first retrieval, and converting the first retrieval formula to a second retrieval formula relating to a second schema and directed to second retrieval that is equivalent to the first retrieval.

A document database system is constructed by adding the database for storing document data to the above document database management apparatus.

According to another aspect of the invention, there is provided a database management apparatus comprising:

means for designating a schema and a document component thereof;

means for displaying a list of semantic descriptions that are applicable to the designated document component;

means for selecting, for the designated document component, one of the semantic descriptions being displayed; and means for storing, in a correlated manner, the designated schema and the selected semantic description.

DESCRIPTION OF THE PREFERRED EMBODIMENT

Figure 1:
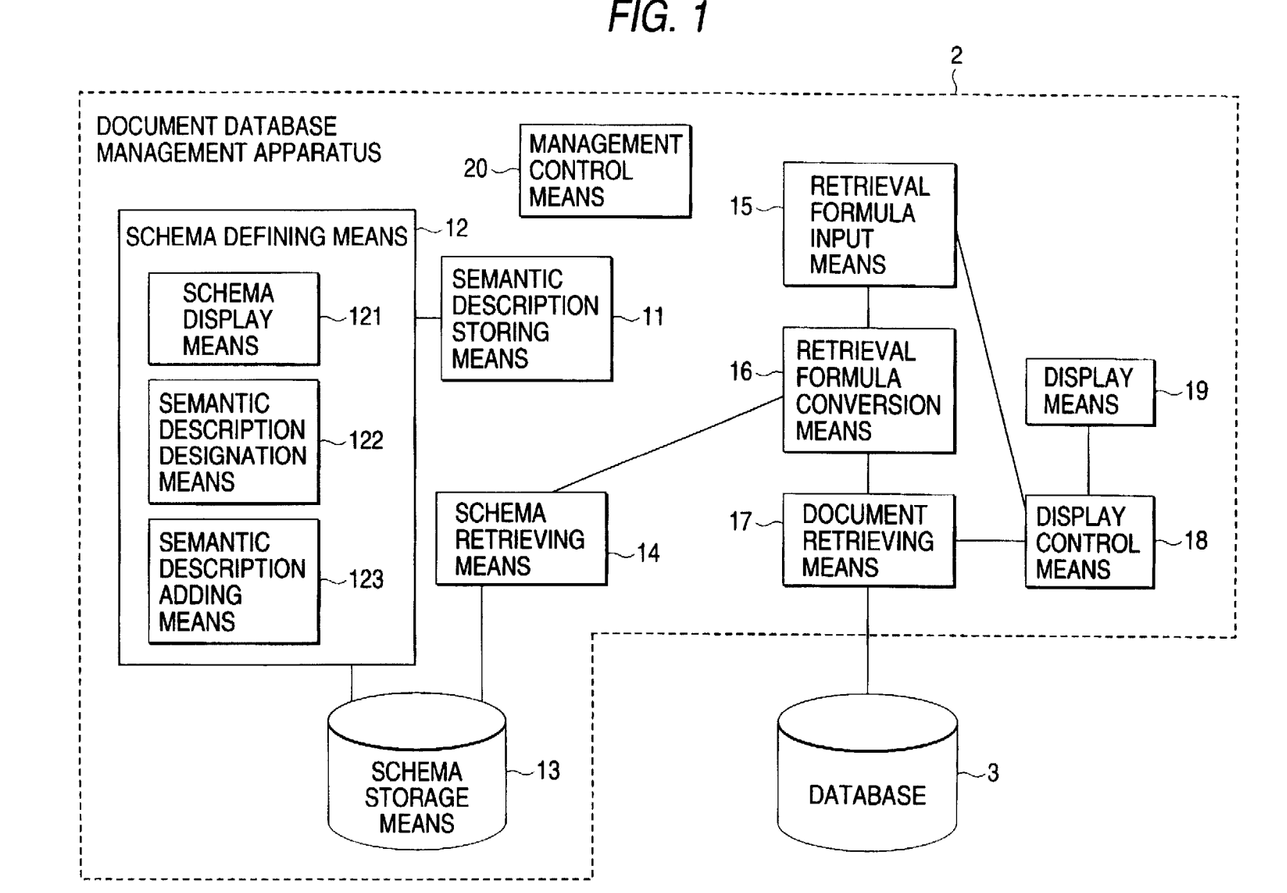
FIG. 1 is a block diagram showing a general configuration of a document database system according to an embodiment of the present invention.

FIG. 1 is a block diagram showing a general configuration of a document database system according to an embodiment of the present invention.

A document database system 1 includes a database management apparatus 2 and a database 3 for storing a number of structured documents as a subject of management. The database 3 is connected to a network (not shown) when necessary.

The database management apparatus 2 is made up of a semantic description storing means 11 for storing a finite number of semantic descriptions defined by the database management apparatus 2, a schema defining means 12 (described later), a schema storage means 13 for storing schema definitions, a schema retrieving means 14 for calling a desired schema from the schema storage means 13, a database retrieving section for finding a document from the database 3 based on a retrieval formula, a display section for displaying a retrieval formula or results of retrieval, and a management control means 20 for managing and controlling the above respective means and sections.

The schema defining means 12 is made up of a schema display means 121 for displaying a defined schema, a semantic description designating means 122 for designating one of the semantic descriptions stored in the semantic description storing means 11 as a document component of a schema, and a semantic description adding means 123 for adding a new semantic description to the semantic description storing means 11.

The database retrieving section is made up of a retrieval formula input means 15 for reading a retrieval formula, a retrieval formula conversion means 16 that reads a schema definition from the schema retrieving means 14 and converts a retrieval formula by using the readout semantic description, and a document retrieving means 17 for evaluating a retrieval formula obtained by conversion by the retrieval formula conversion means 16. The display section is made up of a display control means 18 for controlling the display of a retrieval formula, retrieval results, etc., and a display means 19 for displaying a retrieval formula, retrieval results, etc.

Figure 2:
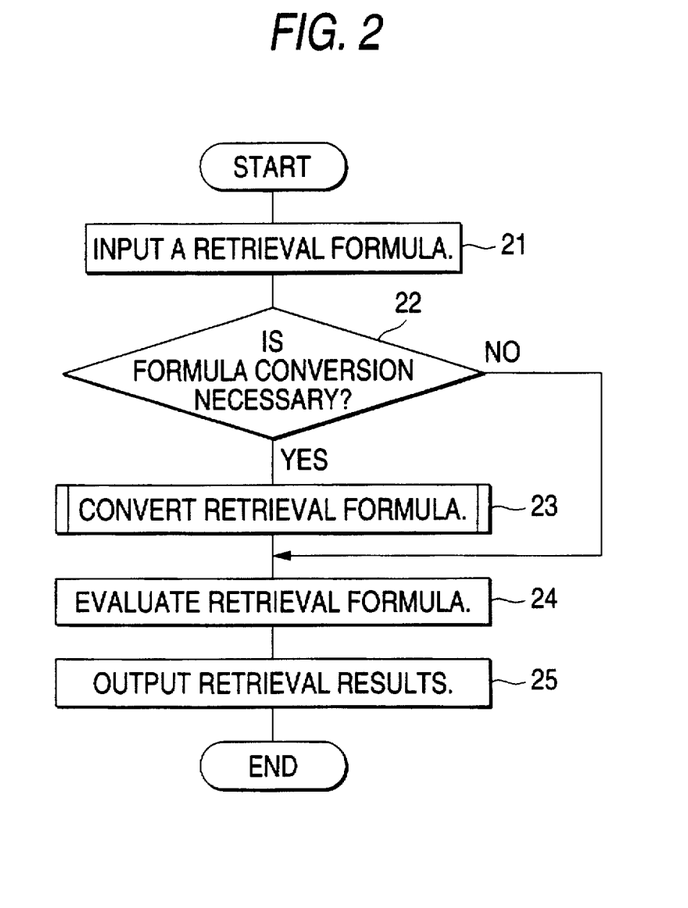
FIG. 2 is a flowchart showing a document retrieving process in the document database system of FIG. 1.

FIG. 2 is a flowchart showing a document retrieving process in the document database system of FIG. 1.

Referring to FIG. 2, to retrieve a document, an inquiry editor (not shown) is activated and displayed on the display means 19. A retrieval formula is input into the displayed inquiry editor through the retrieval formula input means 15 (step 21).

The retrieval-formula conversion means 16 causes the schema retrieval means 14 to call a correspondence between a schema and a semantic description designated by the semantic description designating means from the schema storage means 13, and checks whether conversion of the retrieval formula is necessary (step 22).

When the conversion of the retrieval formula is judged necessary, the retrieval formula conversion means 16 converts the retrieval formula, and sends a retrieval formula thus produced to the document retrieving means 17 (step 23). A method of converting a retrieval formula will be described later.

When the conversion of the retrieval formula is judged unnecessary, the retrieval formula conversion means 16 sends the retrieval formula that was input by the retrieval formula input means 15 to the document retrieving means 17. The document retrieving means 17 evaluates the input retrieval formula, and gains desired document data from the database 3 (step 24).

The display control means 18 controls the operation of displaying, on the display means 19, results of the retrieval made by the document retrieving means 17 (step 25).

Figure 3:
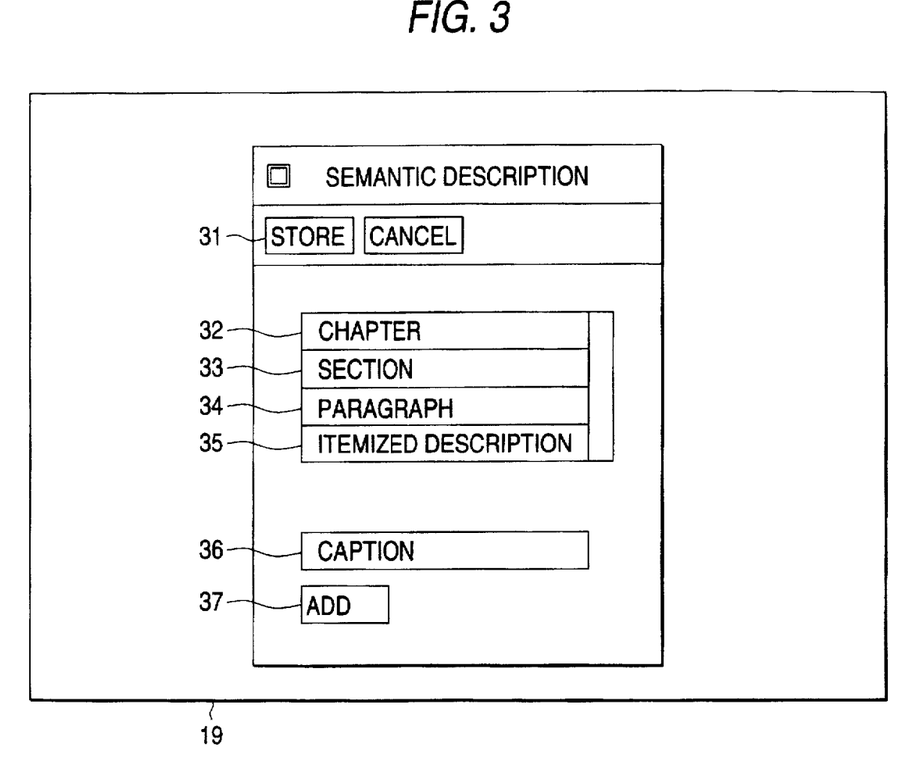
FIG. 3 shows a list of semantic descriptions retained by the document database system in the embodiment of the invention.

FIG. 3 is a list of semantic descriptions retained by the document database system in the embodiment of the invention.

The semantic descriptions of document components of a schema shown in FIG. 3 are displayed as a window of the display means 19. Four types of document components, "chapter" 32, "section" 33, "paragraph" 34, and "itemized description" 35, are incorporated in the document database system. The list of the semantic descriptions, which is, for instance, a scrolling list as shown in FIG. 3, is stored in the semantic description storing means 11.

A semantic description can be added to the document database system, if necessary. For example, "caption" is added as a new document component of the document database system by describing it in a text description field 36, designating "add" 37, and clicking "store" 31.

Figure 4:
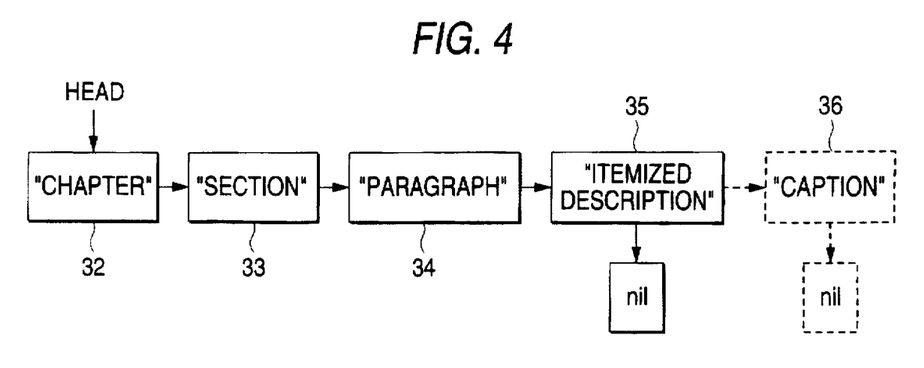
FIG. 4 shows an example of a data structure employed by the semantic description storing means in the embodiment of the invention.

FIG. 4 shows an example of a data structure employed by the semantic description storing means 11 in the embodiment of the invention.

The semantic description storing means 11 is realized as a file of secondary storage or a dictionary incorporated in a program of the document database system. In the latter case, it can be described, for instance, in the form of a linear list as shown in FIG. 4.

In FIG. 4, "chapter" 32 is a head of the list, and "itemized description" 35 is given a special symbol "nil," which indicates the end of the document components. When "caption" is added as a new semantic description, the position of "nil" is shifted as indicated by a dotted line in FIG. 4.

Figure 5A:
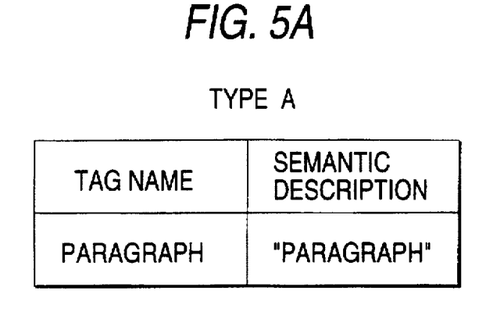
FIGS. 5A–5C show semantic descriptions designated for a schema in the embodiment of the invention.
Figure 5B:
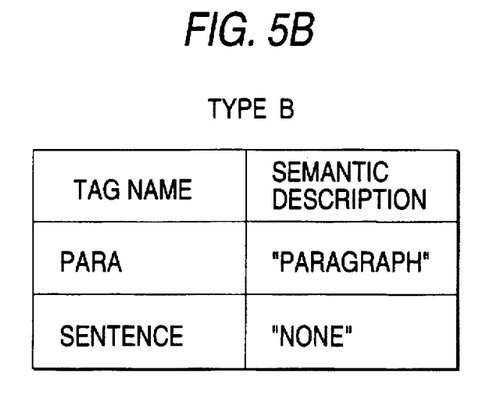
Figure 5C:
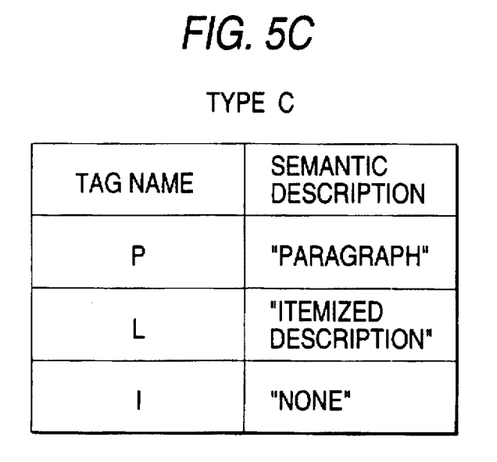

FIGS. 5A–5C show semantic descriptions designated for a schema in the embodiment of the invention.

A schema definition, which is stored in the schema storage means 13, consists of a document type definition and semantic descriptions designated for the schema. As shown in FIGS. 5A–5C, the semantic descriptions designated for each of document types A to C (schemata) are stored in the form of a table correlating the semantic descriptions with tag names.

In document type A, the semantic description "paragraph" is described for the tag name "Paragraph." On the other hand, in document type B, the semantic description "paragraph" is described for the tag name "Para". In document type C, the semantic description "paragraph" is described for the tag name "P". In document types A to C, while the tag names are different, i.e., "Paragraph", "Para" and "P", their semantic descriptions are the same, i.e., "paragraph."

Figure 6:
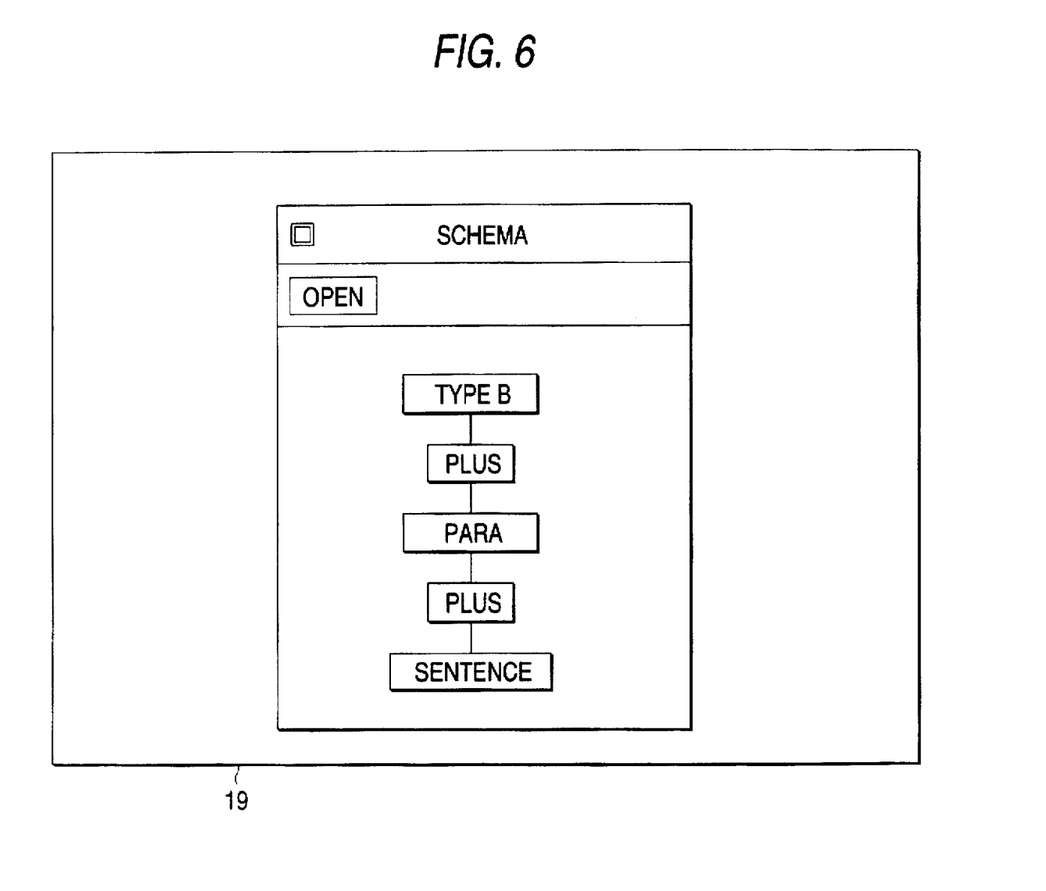
FIG. 6 shows an example of display of a schema.

FIG. 6 shows an example of display of a schema. The database management apparatus of this embodiment employs a schema editor shown in FIG. 6 is used as the schema defining means 12. The schema editor provides a user interface for graphically defining a schema on the display means 19.

In FIG. 6, the schema corresponds to the document type "Type B" shown in FIG. 5(B). Nodes with labels "Type B", "Paragraph" and "Sentence" are document components of the schema "type B." A node with a label "plus" indicates that there is a repetition of more than one lower-rank node, and corresponds to "+" in the content model designation of SGML.

Figure 7:
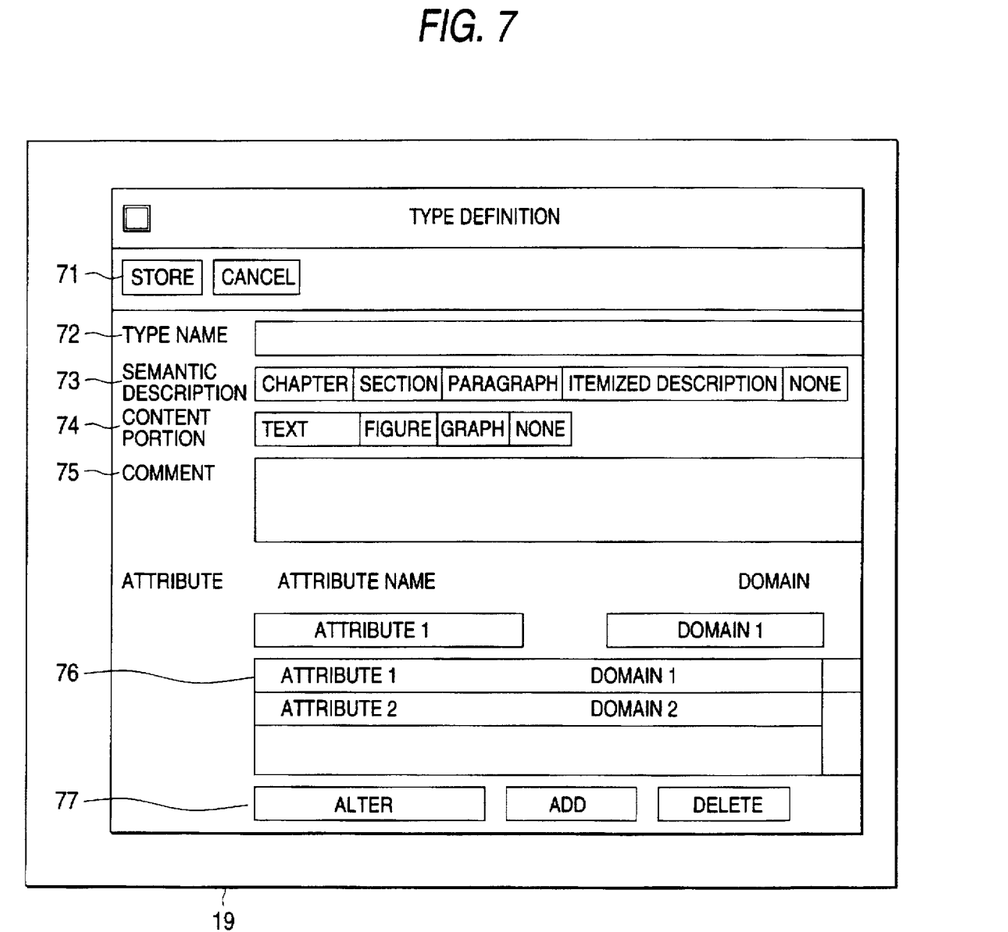
FIG. 7 shows a tool for defining a document component of a schema in the embodiment of the invention.

FIG. 7 shows a tool for defining a document component of a schema in the embodiment of the invention. The tool shown in FIG. 7 is activated by selecting a document component by using the schema editor shown in FIG. 6 and clicking "open," and displayed as a window of the display means 19. The tool of FIG. 7 is activated by the management control means 20 and the display control means 18 of the document database management apparatus 2 when a user designates start of retrieval.

The tool consists of a field 71 for designating the storage or cancellation of a schema definition, a field 72 for describing a document component name (or type name) of a schema, a field 73 for displaying kinds of semantic descriptions, a field 74 for displaying types of a content portion of a document (only when it has a content), a comment description field 75, a domain display field 76 for displaying a domain (value range) of an attribute, and a field 77 for an instruction to alter, add or delete a type definition.

A comment described in the field 75 is information allowing a user to understand the function of the document component by reading it. An attribute definition consists of an attribute name and a domain. In the graphical user interface as shown in FIG. 7, only one of the semantic descriptions is selectively designated as a document component of the schema. The portion of "semantic description" in the user interface corresponds to the semantic description designating means 122. An array of buttons of "semantic description" in the graphical user interface indicates the semantic descriptions retained by the document database system. When it is not necessary to designate a particular semantic description, the button "None" is selected.

The semantic description designated by using the graphical user interface is taken out from the semantic description storing means 11, and stored into the schema storage means 13 as a part of the schema definitions. The semantic descriptions stored in the schema storage means 13 are accessed by the retrieval formula conversion means 16 and used for automatic conversion of a retrieval formula.

An example of automatic conversion of a retrieval formula using a semantic description will be given below. The retrieval formula conversion is carried out by the retrieval formula conversion means 16.

Figure 8:
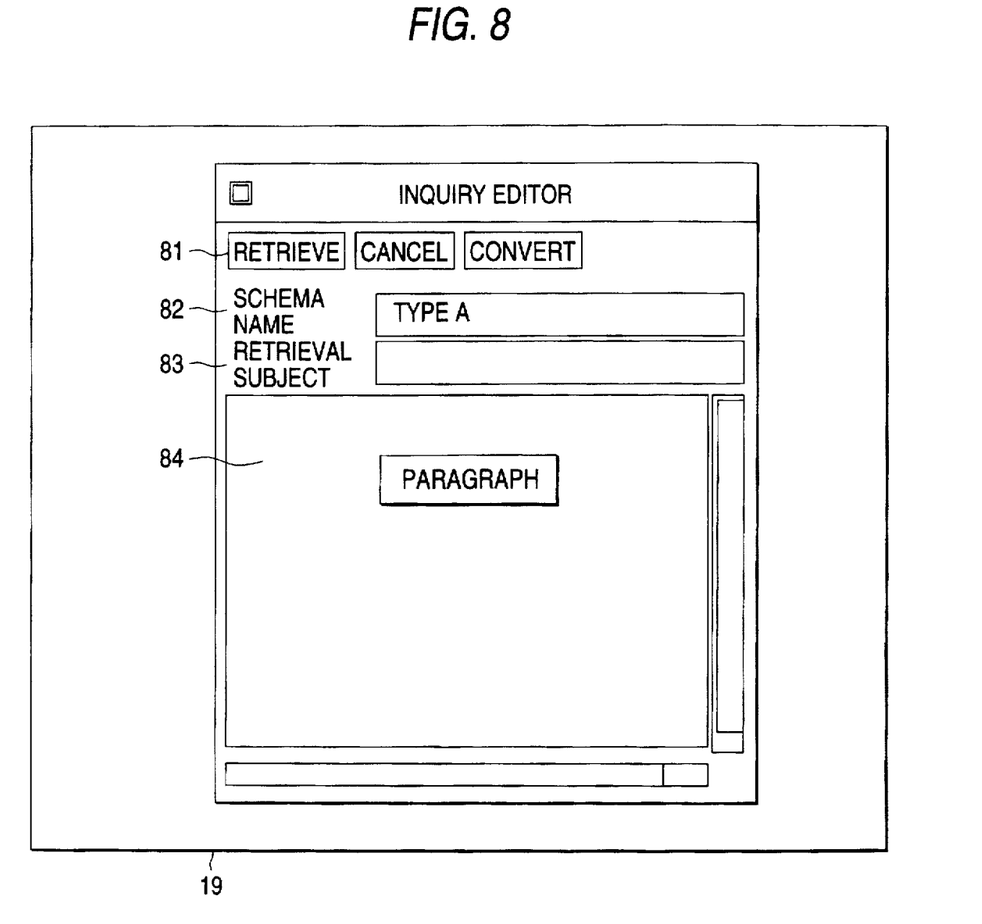
FIG. 8 shows an inquiry editor in the embodiment of the invention.
Figure 9:
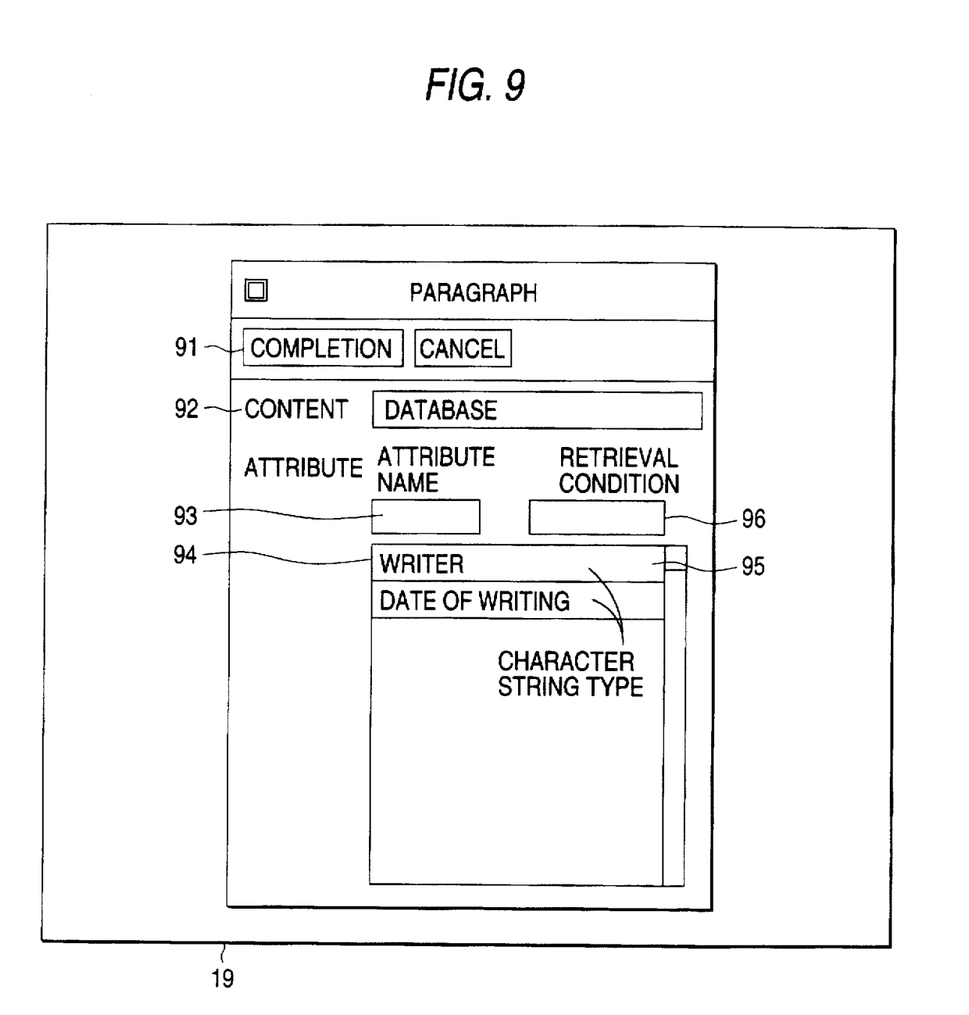
FIG. 9 shows an inquiry editor for designating a condition with respect to a node in the embodiment of the invention.

FIG. 8 shows an inquiry editor in the embodiment of the invention. FIG. 9 shows an inquiry editor for designating a condition with respect to a node in the embodiment of the invention.

An example of a retrieval formula for retrieving a paragraph including a character string "database" from a group of documents of "Type A" is given below. After the following description is made, a retrieval start button (not shown) is clicked to start retrieval.

| SELECT | paragraph |
| FROM | Type A |
| WHERE | paragraph contains "database" |

The above retrieval formula is described in a syntax similar to that of the SQL (database language ISQ 9075). Alternatively, it may be designated graphically by using the inquiry editor shown in FIG. 8. FIG. 8 shows that the condition is directed to the component "paragraph" of "type A."

The inquiry editor shown in FIG. 8 includes a field 81 for executing retrieval, cancellation or conversion, a schema name display field 82, a retrieval subject description field 83, and a document component description field 84.

In the document database system 1, when the schema name of the retrieval subject is a document group having the schema name "type A," "type A" is displayed in the schema name display field 82. A document component, e.g., "paragraph", is described in the document component description field 84.

After the retrieval subject and the document component are described, the inquiry editor of FIG. 9 is displayed, for instance, by displaying a menu (not shown) or clicking the document component.

The inquiry editor of FIG. 9 for designating a condition for the nodes shown includes an execution field 91 for completing the designation of a condition for the node or executing cancellation, a content description field 92 for describing a retrieval content, a field 93 for describing an attribute name of a document, an attribute display field 94, a domain display field 95 for showing a domain of the attribute displayed in the attribute display field 94, and a retrieval condition description field 96 for inputting, for instance, "Hisashi Nakatsuyama" as the name of a document writer while looking at a data type, e.g., a character string type in the domain display field 95.

FIG. 9 shows conditions that the document writer is "Hisashi Nakatsuyama" and that the content of "paragraph" of a document includes a character string "database."

Upon completion of the designation of FIG. 9, a user clicks "completion" in the execution field 91, so that the inquiry editor of FIG. 8 is displayed again. By clicking "retrieve" in the execution field 81, retrieval is started under the above conditions.

Assume that with the retrieval formula of FIG. 8, a document group of "Type C" is to be retrieved when the retrieval subject is a document group having the schema name "Type A." If the inquiry editor of FIG. 8 is to be used, a user inputs "Type C" into the retrieval subject description field 83 and clicks the "retrieval" button in the execution field 81. In response, the retrieval formula conversion means 16 of the document database management apparatus 2 converts the current retrieval formula to be suitable for the document group of "type C," and then the retrieval process is executed. During this process, the display of the inquiry editor of FIG. 8 remains unchanged.

An example of conversion of a retrieval formula will be described below.

First, the retrieval formula conversion means 16 scans the contents of the schema storage means 13 to check the semantic description of the document component "Paragraph" of "Type A". In this instance, the semantic description of the document component "Paragraph" literally means a paragraph.

Then, the retrieval formula conversion means 16 scans the contents of the schema storage means 13 to check the definition of "Type C". More specifically, the retrieval formula conversion means 16 searches for a document component of "Type" whose semantic description is "paragraph". In this case, it is "P." Therefore, based on the original retrieval formula, a new retrieval formula for retrieving a document group of "Type C" is found to be following one.

| | |
|---|---|
| SELECT | P |
| FROM | Type C |
| WHERE | P contains "database" |

In the inquiry editor shown in FIG. 8, when the "conversion" button is clicked, the formula is converted to a retrieval formula for the retrieval of "type C." Then, the content of the schema name display field 82 is changed to "type C," and the retrieval subject description field 83 becomes empty.

Subsequently, when the "retrieval" button is clicked, a retrieval process is carried out as in the case of "type A."

Figure 10:
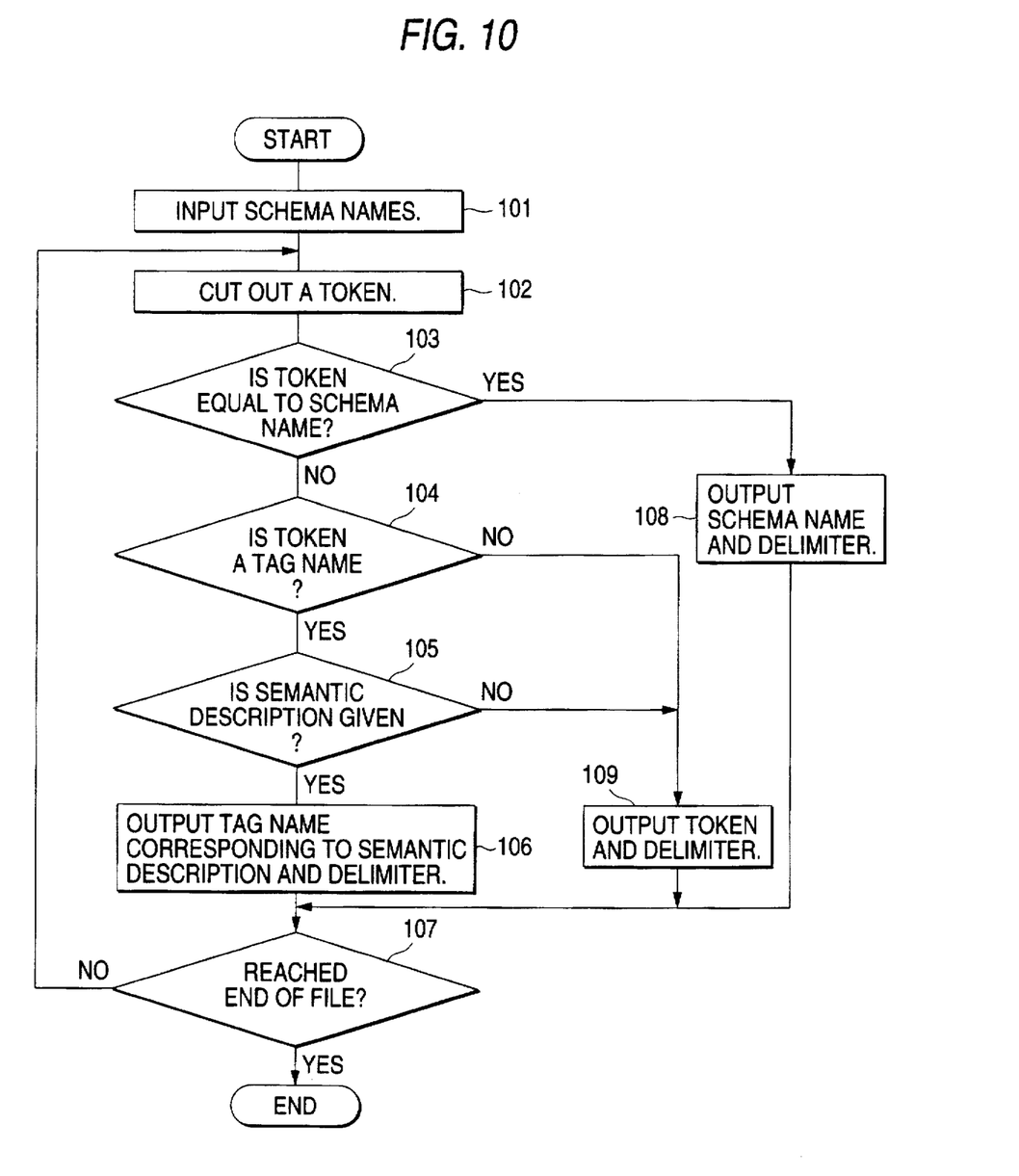
FIG. 10 is a flowchart showing a retrieval formula automatic conversion process in the embodiment of the invention.

FIG. 10 is a flowchart showing a retrieval formula automatic conversion of in the embodiment of the invention.

Prior to the retrieval, a user activates the inquiry editor to display the schema display means 121.

In step 101, a retrieval formula as described above, a schema name (I in this example) to which a subject of the retrieval formula belongs, and a schema name (O in this example) to which a subject after the conversion belongs are input through the retrieval formula input means 15, which is, for instance, a graphical user interface.

In step 102, the retrieval formula conversion means 16 cuts out one token from the retrieval formula.

In step 103, the retrieval formula conversion means 16 checks whether the token is equal to the schema name I.

In step 108, if it is equal to the schema name I, the retrieval formula conversion means 16 supplies the schema name I and a delimiter (space, tab, or the like) to the document retrieving means 17.

If the token is not equal to the schema name I, the retrieval formula conversion means 16 checks the definition of the schema I of the schema storage means 13, and determines whether the token is a document component name (tag name) of the schema I (step 104).

If the token is not a tag name of the schema I, the retrieval formula conversion means 16 supplies the token (e.g., "SELECT") and a delimiter to the document retrieving means 17 (step 109).

If the token is a tag name of the schema I, the retrieval formula conversion means 16 checks semantic descriptions of the schema I of the semantic description storing means 11, and determines whether the tag name is given a semantic description (step 105).

If no semantic description is given to the tag name, the retrieval formula conversion means 16 supplies the token and a delimiter to the document retrieving means 17 in the same manner as in the case where a negative judgment is made in step 104 (step 109).

If a semantic description is given to the tag name, the retrieval formula conversion means 16 checks the semantic description of the schema O of the semantic description storing means 11, and supplies the tag name of the schema O corresponding to the semantic description and a delimiter to the document retrieving means 17 (step 106).

In step 107, the retrieval formula conversion means 16 checks whether a retrieval formula is present in the file. If it is judged that a token to be processed still exists, the retrieval formula conversion means 16 returns to step 102, and cuts out the next token.

If there remains no token to be processed, the retrieval formula conversion means 16 finishes the execution of the process.

The retrieval formula that has been obtained by converted or newly generated by the retrieval formula conversion means 16 is evaluated by the document retrieving means 17, and a set of documents is obtained as a result of the retrieval. The expression of the database 3 and the retrieval formula can be evaluated in the same manner as in the existing object-oriented database system.

Although in the above embodiment the retrieval formulae are described in the syntax similar to that of the SQL, they may be described in a language close to a natural language. For example, a user can produce a retrieval formula by making a statement "Retrieve paragraphs of Type-A documents which paragraphs contain a character string 'database'" on a graphical user interface.

However, the retrieval conditions cannot be described entirely freely, but they should be described in such a manner as to allow processing by a machine. In the above example, since "paragraph" is designated as a semantic description of a document component, a retrieving formula described in a syntax similar to that of the SQL is generated by retrieving the semantic description of "Type A" by scanning the schema storage means 13, and finding a document component of whose semantic description is "paragraph."

Although in the above embodiment, the semantic descriptions are incorporated in the document database system and is therefore fixed, they may be added to the system in the form of an application. For example, the system may be adapted to allow addition of a semantic description to a linear list as shown in FIG. 4 by using a tool as shown in FIG. 3. Where the above-described four kinds of semantic descriptions are incorporated, a database manager can add a semantic description "caption" to the linear list.

As is apparent from the foregoing description, according to the invention, a schema and semantic descriptions for its document components are stored in the schema storage means in a correlated manner. This facilitates retrieval for a schema different from the current one. This is because the retrieval formula conversion means can automatically convert the current retrieval formula to a formula that is applicable to a different schema, based on a corresponding relationship stored in the schema storage means between schemata and semantic descriptions of document components of the schemata. Therefore, it is easy to make the retrieval for different schemata.

According to the invention, the document database system can perform retrieval under the particular retrieval conditions by accessing, for instance, a database connected to a network.

Further, according to the invention, with provision of the component designating means for designating a document component and the semantic description display means for displaying a list of semantic descriptions for document components of a schema, a retrieval formula for a schema different from the current one can be generated easily on the graphical user interface.

What is claimed is:

1. A document database management apparatus for managing documents of a plurality of document types, each document type comprising a plurality of document components, the database managing apparatus comprising:

means for storing semantic descriptions that represent meanings of the document components;

means for associating the semantic descriptions stored in the semantic description storing means to the document components;

means for storing a schema definition for each of the plurality of document types, each said schema definition including an indication of the document type, the document components of the document type, and the semantic descriptions associated with the document components of the document type; and     means for accessing a database by using the schema definitions to determine corresponding document components of different document types.

2. The database management apparatus according to claim 1, wherein the database retrieving means includes means for receiving a first retrieval formula relating to a first schema definition and directed to a first retrieval and converting the first retrieval formula to a second retrieval formula relating to a second schema definition and directed to a second retrieval that is equivalent to the first retrieval.

3. The document database managing apparatus according to claim 1, further comprising a database for storing document data.

4. A database management apparatus comprising:

means for designating a schema definition and a document component thereof;

means for displaying a list of semantic descriptions that are applicable to the designated document component;

means for selecting, for the designated document component, one of the semantic descriptions being displayed; and     means for storing the designated schema definition, each said stored schema definition including an indication of document type and an association of document components of the document type with the selected semantic description.

* * * * *